United States Patent
Matsuo

(10) Patent No.: US 10,679,641 B2
(45) Date of Patent: Jun. 9, 2020

(54) NOISE SUPPRESSION DEVICE AND NOISE SUPPRESSING METHOD

(71) Applicant: FUJITSU LIMITED, Kawasaki-shi, Kanagawa (JP)

(72) Inventor: Naoshi Matsuo, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/638,125

(22) Filed: Jun. 29, 2017

(65) Prior Publication Data
US 2018/0033448 A1 Feb. 1, 2018

(30) Foreign Application Priority Data
Jul. 27, 2016 (JP) .................................. 2016-147416

(51) Int. Cl.
*G10L 21/00* (2013.01)
*G10L 21/02* (2013.01)
(Continued)

(52) U.S. Cl.
CPC .......... *G10L 21/0264* (2013.01); *G10L 15/20* (2013.01); *G10L 21/0232* (2013.01); *G10L 25/84* (2013.01)

(58) Field of Classification Search
CPC . G10L 21/0232; G10L 21/0208; G10L 25/84; G10L 15/02; G10L 15/10;
(Continued)

(56) References Cited

U.S. PATENT DOCUMENTS 3,855,423 A * 12/1974 Brendzel ................ H04B 1/123
708/323
6,351,731 B1 * 2/2002 Anderson ........... G10L 21/0208
704/225
(Continued)

FOREIGN PATENT DOCUMENTS

EP 0992978 A1 4/2000
EP 1100077 A2 5/2001
(Continued)

OTHER PUBLICATIONS

Extended European Search Report dated Oct. 9, 2017 for corresponding European Patent Application No. 17178684.1, 7 pages.

*Primary Examiner* — Michael Ortiz-Sanchez
(74) *Attorney, Agent, or Firm* — Fujitsu Patent Center

(57) ABSTRACT

A noise suppression device including: a processor configured to: divide a voice signal into frames such that two successive frames overlap each other; compute a frequency spectrum for the voice signal; remove a noise component from an amplitude component of the frequency spectrum to compute a noise suppression amplitude component; compare amplitude components or noise suppression amplitude components for each pair of successive frames to compute a comparison value for each frequency; compute a gain according to the comparison value for each frequency; compute a corrected amplitude component for each frequency by multiplying the noise suppression amplitude component by the corresponding gain; and compute a corrected voice signal based on the corrected amplitude component for each frequency.

11 Claims, 8 Drawing Sheets

(51) Int. Cl.
*G10L 21/0264* (2013.01)
*G10L 21/0232* (2013.01)
*G10L 15/20* (2006.01)
*G10L 25/84* (2013.01)

(58) Field of Classification Search
CPC ..... G10L 15/00; G10L 25/00; G10L 21/0316;
G10L 2021/02082; G10L 2021/02165;
G10L 2021/02087; G10L 2021/02085;
H04R 1/1083; H04M 9/082
See application file for complete search history.

(56) References Cited

U.S. PATENT DOCUMENTS

| | | | |
|---|---|---|---|
| 2005/0256705 | A1 | 11/2005 | Kazama et al. |
| 2011/0123045 | A1* | 5/2011 | Tasaki ................. G10L 21/0208 381/94.2 |
| 2014/0149111 | A1 | 5/2014 | Matsuo |
| 2015/0318902 | A1* | 11/2015 | Sugiyama ........... G10L 21/0232 375/150 |

FOREIGN PATENT DOCUMENTS

| | | |
|---|---|---|
| EP | 2738763 A2 | 6/2014 |
| JP | 2014-106494 | 6/2014 |

\* cited by examiner

FIG. 3
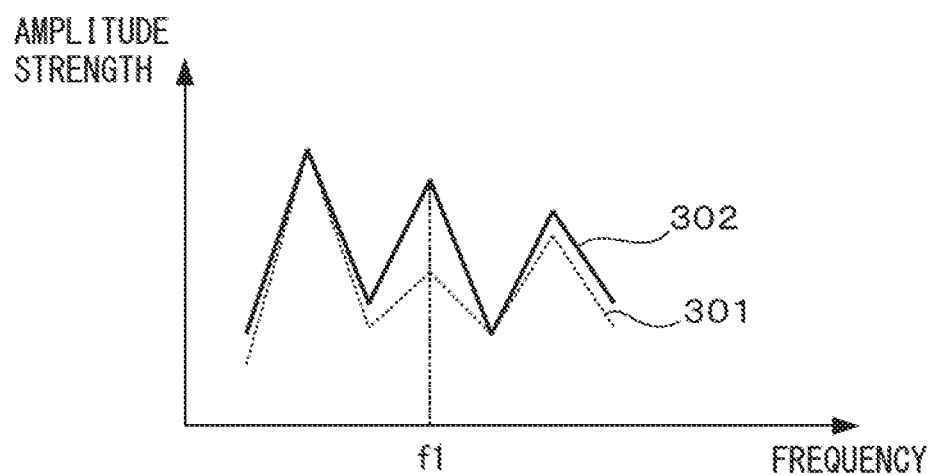
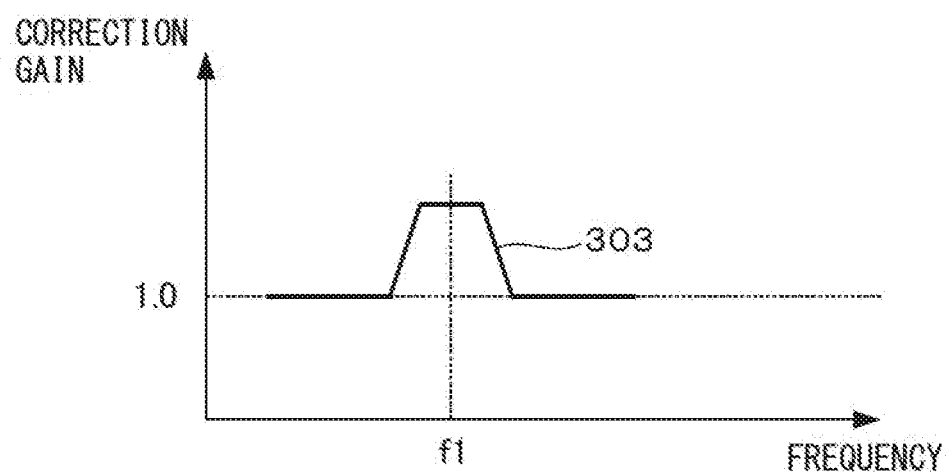

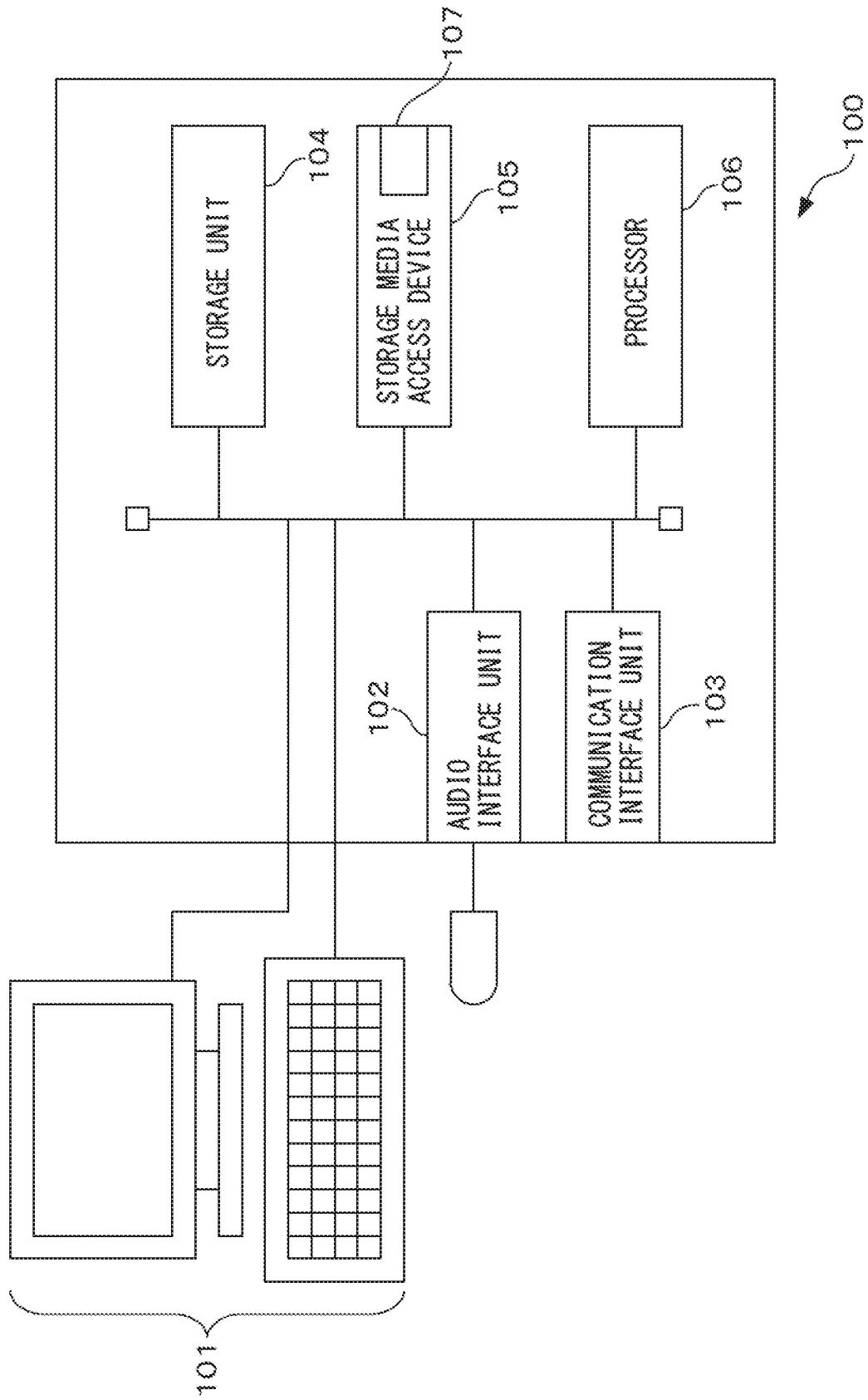

NOISE SUPPRESSION DEVICE AND NOISE SUPPRESSING METHOD

CROSS-REFERENCE TO RELATED APPLICATION

This application is based upon and claims the benefit of priority of the prior Japanese Patent Application No. 2016-147416, filed on Jul. 27, 2016, and the entire contents of which are incorporated herein by reference.

FIELD

The embodiments discussed herein are related to a noise suppression device, a noise suppressing method, and a computer program for noise suppression that suppresses a noise component contained in a voice signal.

BACKGROUND

A voice collected by a microphone may contain a noise component. When a collected voice contains a noise component, the voice may be hard to hear. Moreover, the noise component may reduce the recognition accuracy of the voice. Thus, a technique has been developed to suppress noise components by estimating, for each frequency, a noise component contained in a voice signal and subtracting the estimated noise component from the amplitude spectrum of the voice signal. In this technique, however, signal components may be also suppressed with noise components when the noise components are suppressed. This may lead to difficulty in hearing the original voice. To solve this problem, a technique has been proposed to compute a signal-to-noise ratio for each frequency, select a frequency band in which a signal component that can be recognized in a voice signal is represented by the signal-to-noise ratio, and determine a gain according to the signal-to-noise ratio of the selected frequency band (For example, see Japanese Laid-Open Patent Publication No. 2014-106494).

SUMMARY

However, for example, when a driver's voice is collected through a microphone installed in a vehicle during driving the vehicle, in particular, when the operation sound of a vehicle air conditioner is loud, the voice signal may contain a quite large noise component. In this case, the signal-to-noise ratio is relatively small for each frequency of the voice signal and thus a set gain may not be optimized in the technique of the related art.

According to one embodiment, a noise suppression device is provided. The noise suppression device includes a processor configured to: divide a first voice signal into frames, each having a predetermined length of time, such that the two successive frames overlap each other, the first voice signal being obtained by a first microphone; transform the first voice signal into a frequency domain for each of the frames to compute a first frequency spectrum for the first voice signal; remove, for each of the frames, a noise component from an amplitude component of the first frequency spectrum for each frequency to compute a noise suppression amplitude component; compare, for each pair of the successive frames, the amplitude components or the noise suppression amplitude components for each frequency of the first frequency spectrum to compute a comparison value for each frequency; compute, for each pair of the successive frames, a gain according to the comparison value for each frequency; compute, for each pair of the successive frames, a corrected amplitude component for each frequency by multiplying the noise suppression amplitude component of one of the frames for each frequency by the corresponding gain; compute, for each of the frames, a corrected frequency spectrum from a phase component of the first frequency spectrum and the corrected amplitude component for each frequency; and transform the corrected spectrum into a time domain to compute a corrected voice signal.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram illustrating an example of the relationship between an amplitude spectrum and a correction gain after noise suppression on two successive frames.

FIG. 8 is a block diagram of a computer operated as a noise suppression device by executing computer programs for implementing the functions of the units of the noise suppression device according to any one of the embodiments or the modified examples.

DESCRIPTION OF EMBODIMENTS

A noise suppression device will be described below with reference to the accompanying drawings. The noise suppression device divides a voice signal into frames. Each frame is set such that two successive frames partially overlap each other. The noise suppression device suppresses a noise component by subtracting an amplitude component, which corresponds to the noise component, from the amplitude component of the frequency spectrum of each frame. At this point, the noise suppression device compares the amplitude components between the two successive frames for each frequency after the noise suppression. Then, the noise suppression device corrects, for the frequency at which a difference between the amplitude components is large, the amplitude component of one of the two successive frames (e.g., the temporally subsequent frame) so as to reduce the difference.

Figure 1:
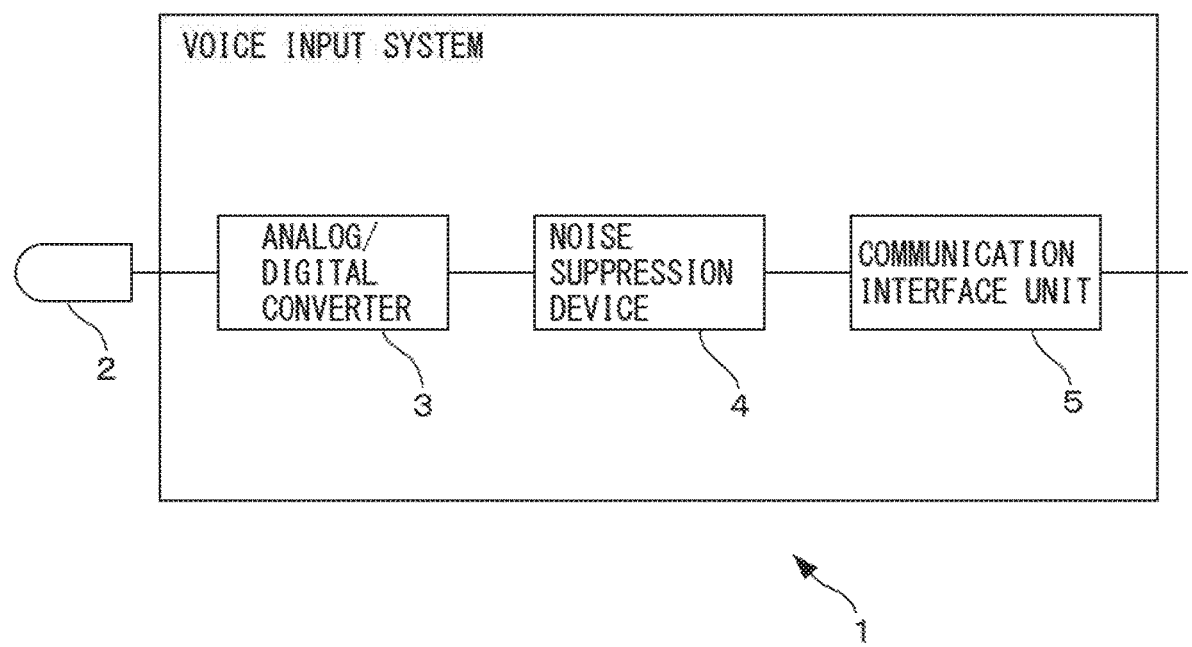
FIG. 1 is a schematic diagram illustrating the configuration of a voice input system including a noise suppression device according to a first embodiment.

FIG. 1 is a schematic diagram illustrating the configuration of a voice input system including a noise suppression device according to a first embodiment. In the present embodiment, the voice input system 1 is, for example, a vehicle-mounted hands-free phone including a microphone 2, an analog/digital converter 3, a noise suppression device 4, and a communication interface unit 5.

The microphone 2 is an example of a voice input unit that collects sound around the voice input system 1, generates an analog voice signal according to the intensity of the sound, and outputs the analog voice signal to the analog/digital converter 3. The analog/digital converter 3 amplifies the analog voice signal and then samples the amplified analog voice signal with a predetermined sampling frequency so as to generate a digitized signal. Subsequently, the analog/digital converter 3 outputs the digitized voice signal to the noise suppression device 4. Hereinafter, the digitized voice signal will be simply referred to as a voice signal.

The voice signal contains signal components to be collected, e.g., a voice from a user of the voice input system 1, and a noise component, such as background noise. The noise suppression device 4 includes, for example, a digital signal processor and generates a corrected voice signal by suppressing the noise component contained in the voice signal. Moreover, the noise suppression device 4 outputs the corrected voice signal to the communication interface unit 5.

The communication interface unit 5 includes a communication interface circuit for connecting the voice input system 1 to another device, e.g., a mobile phone. The communication interface circuit may be, for example, a circuit that operates in accordance with short-distance wireless communication standards such as Bluetooth (registered trademark) that can be used for communicating the voice signal or a circuit that operates in accordance with serial bus standards such as Universal Serial Bus (USB). The communication interface unit 5 transmits the corrected voice signal received from the noise suppression device 4 to another device.

Figure 2:
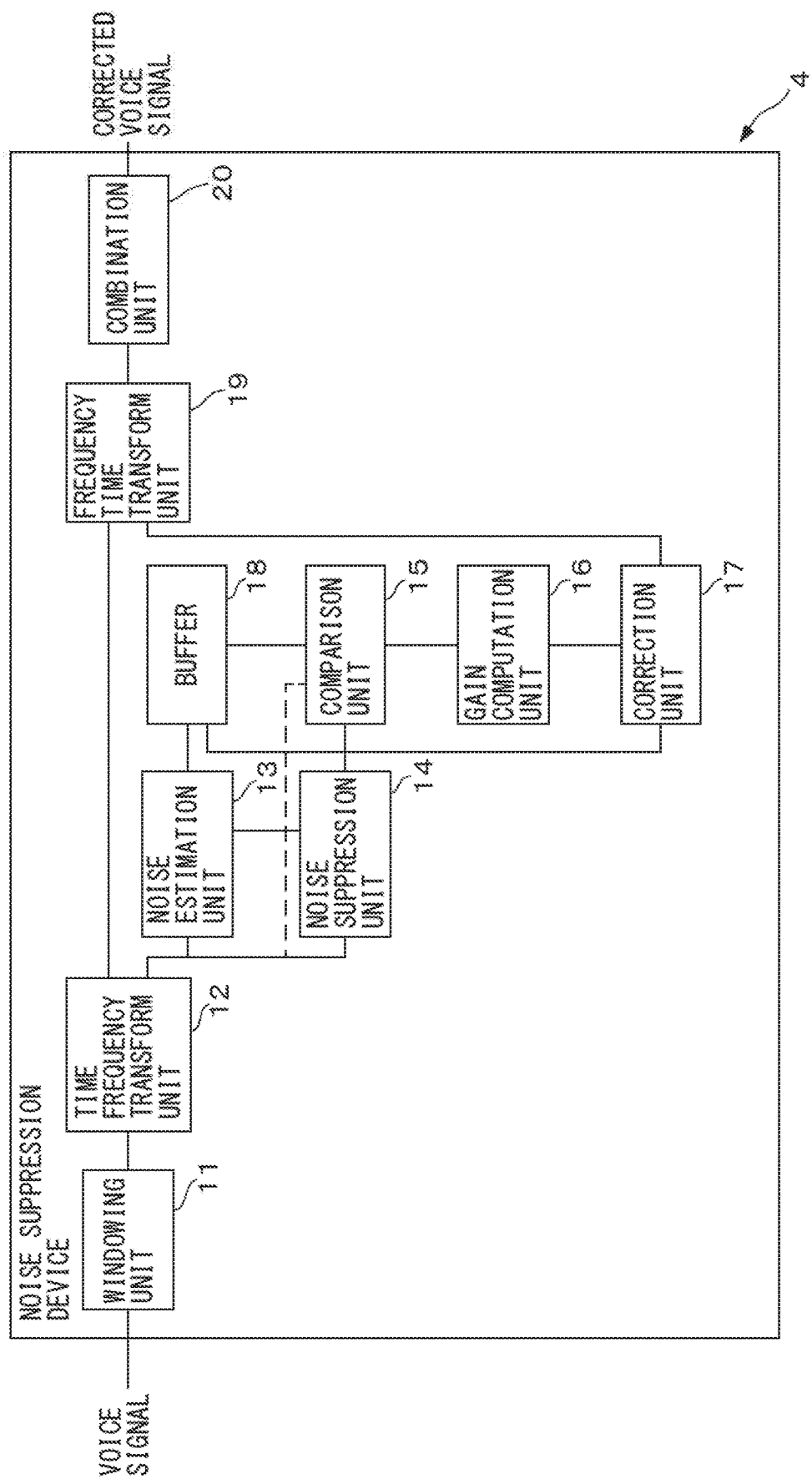
FIG. 2 is a schematic diagram illustrating the configuration of the noise suppression device according to the first embodiment.

FIG. 2 is a schematic diagram illustrating the configuration of the noise suppression device 4 according to the first embodiment. The noise suppression device 4 includes a windowing unit 11, a time frequency transform unit 12, a noise estimation unit 13, a noise suppression unit 14, a comparison unit 15, a gain computation unit 16, a correction unit 17, a buffer 18, a frequency time transform unit 19, and a combination unit 20. The units of the noise suppression device 4 are, for example, function modules implemented by computer programs executed on a digital signal processor. Alternatively, these units may be at least one integrated circuit for implementing the functions of the units.

The windowing unit 11 is an example of a dividing unit that divides a voice signal into frames, each having a predetermined length of time (e.g., several tens of msec). In the present embodiment, the windowing unit 11 sets the frames such that two successive frames are shifted from each other by one-half of a frame length.

Moreover, the windowing unit 11 performs windowing on each of the frames. Specifically, the windowing unit 11 multiplies each of the frames by a predetermined window function. For example, the windowing unit 11 can use a Hanning window as a window function. In this case, as will be specifically described later, distortion caused by combining the frames with corrected amplitude spectrums is suppressed in a corrected voice signal obtained by the combination of the frames.

Each time the windowing unit 11 performs windowing on the frame, the windowing unit 11 outputs the frame to the time frequency transform unit 12.

Each time the time frequency transform unit 12 receives a frame to which the windowing has been applied, the time frequency transform unit 12 transforms the frame from a time domain to a frequency domain, thereby computing a frequency spectrum containing amplitude components and phase components for respective frequencies. For the transformation, the time frequency transform unit 12 computes the frequency spectrum by performing time frequency transform, e.g., fast Fourier transform (FFT), on the frame.

The time frequency transform unit 12 outputs, for each of the frames, an amplitude spectrum containing an amplitude component for each frequency of frequency spectrums to the noise estimation unit 13 and the noise suppression unit 14. Moreover, the time frequency transform unit 12 outputs a phase spectrum containing a phase component for each frequency of frequency spectrums to the frequency time transform unit 19.

The noise estimation unit 13 updates a noise model representing a noise component for each frequency, based on the amplitude spectrum of the current frame, which is the latest frame, the noise component being estimated based on past frames, to estimate a noise component for each frequency in the current frame.

Specifically, each time an amplitude spectrum is received from the time frequency transform unit 12, the noise estimation unit 13 computes an average value p of the amplitude spectrum according to the following equation:

$$p = 10\log_{10}\left(\frac{1}{Fn}\sum_{f=flow}^{fhigh}(S_t(f)^2)\right) \quad (1)$$

where Fn is the total number of frequencies, that is, half of the number of samples contained in one frame for the time frequency transform, $f_{low}$ is a minimum frequency, $f_{high}$ is a maximum frequency, and St(f) is an amplitude component at every frequency f of the current frame.

Subsequently, the noise estimation unit 13 compares the average value p of the amplitude spectrum of the current frame with a threshold value Thr corresponding to the upper limit of a noise component. Moreover, when the average value p is smaller than the threshold value Thr, the noise estimation unit 13 updates the noise model by averaging amplitude components at respective frequencies and noise components in past frames according to the following equation:

$$N_t(f)=(1-\alpha)\cdot N_{t-1}(f)+\alpha|S_t(f)| \quad (2)$$

where $N_{t-1}(f)$ is a noise component at the frequency f, the noise component being contained in the noise model before the update. $N_{t-1}(f)$ is read from the buffer 18. Furthermore, $N_t(f)$ is a noise component at the frequency f, the noise component being contained in the noise model after the update. A coefficient α is a forgetting factor set at, for example, 0.01 to 0.1. When the average value p is equal to or larger than the threshold value Thr, it is estimated that the current frame contains signal components other than noise. Thus, the forgetting factor α is set at 0, allowing the noise estimation unit 13 to use the noise model before the update as the updated noise model. In other words, the noise estimation unit 13 sets $N_t(f)=N_{t-1}(f)$ at all frequencies. Alternatively, when the current frame contains signal components other than noise, the noise estimation unit 13 may reduce the influence of the current frame on the noise model by setting the forgetting factor α at a quite small value, e.g., 0.0001.

The noise estimation unit 13 may estimate noise components at respective frequencies according to any other techniques for estimating noise components at respective frequencies.

The noise estimation unit 13 stores the updated noise model in the buffer 18 and outputs a noise component for each frequency to the noise suppression unit 14.

For each of the frames, the noise suppression unit 14 subtracts, for each frequency, a noise component, which is represented by a noise model, at the frequency from an amplitude component at the frequency. In other words, the noise suppression unit 14 computes $|X_t(f)|=(|S_t(f)|-N_t(f))$, thereby suppressing noise contained in a voice signal. Subsequently, for each of the frames, the noise suppression unit 14 outputs an amplitude spectrum with suppressed noise to the comparison unit 15 and the correction unit 17. Furthermore, the noise suppression unit 14 stores the amplitude spectrum with suppressed noise in the buffer 18. The amplitude spectrum with suppressed noise is an example of a noise suppression amplitude component.

The comparison unit 15 compares amplitude spectrums after noise suppression between two successive frames.

In the present embodiment, the two successive frames overlap each other. Thus, it is generally assumed that the amplitude spectrums are similar to each other between the two frames. It is therefore assumed that a difference between the amplitude components of the two successive frames is relatively small for each frequency. However, when the voice signal is distorted at a frequency in one of the two frames, the difference between the amplitude components of the two frames increases at the frequency. Thus, as an index of the presence or absence of distortion, the comparison unit 15 computes, as a comparison value, a ratio r(f) of the absolute values of the amplitude components in the two frames for each frequency according to the following equation:

$$r(f) = \frac{|X_t(f)|}{|X_{t-1}(f)|} \quad (3)$$

where $|X_t(f)|$ is an amplitude component after noise suppression at the frequency f in the current frame, and $|X_{t-1}(f)|$ is an amplitude component after noise suppression at the frequency f in the preceding frame. The comparison unit 15 may read $|X_{t-1}(f)|$ from the buffer 18 and use $|X_{t-1}(f)|$ for the computation of the ratio r(f).

For each of the frames, the comparison unit 15 outputs the ratio r(f) for each frequency to the gain computation unit 16, the ratio r(f) having been computed between the current frame and the preceding frame.

The gain computation unit 16 computes, for each of the frames, a correction gain for each frequency based on the ratio r(f) of amplitude components for each frequency after the noise suppression between the two successive frames.

As described above regarding the comparison unit 15, when distortion occurs at a frequency in one of the two successive frames, a difference between the amplitude components of the two successive frames at the frequency increases. Thus, the gain computation unit 16 compares the ratio r(f) with a predetermined threshold value for each frequency. At a frequency where the ratio r(f) is smaller than the predetermined threshold value, the gain computation unit 16 sets a correction gain larger than 1, whereas at a frequency where the ratio r(f) is equal to or larger than the predetermined threshold value, the gain computation unit 16 sets a correction gain of 1. For example, the gain computation unit 16 computes a correction gain for each frequency according to the following equation:

$$G(f) = \frac{\beta}{r(f)} = \beta \frac{|X_{t-1}(f)|}{|X_t(f)|} \quad \text{if } r(f) < \alpha \quad (4)$$
$$G(f) = 1.0 \quad \text{if } r(f) \geq \alpha$$

where α is a threshold value set at 0 to 1, e.g., 0.5, β is a correction factor set at a positive value larger than 0, e.g., 0.5, and G(f) is a correction gain at the frequency f. The threshold value α and the correction factor β may be equal to each other or different from each other. However, the correction factor β is also preferably equal to or smaller than 1. This is because the correction factor β exceeding 1 may excessively increase the value of the correction gain G(f) and the correction gain may excessively emphasize amplitude components so as to distort the corrected voice signal.

FIG. 3 is a diagram illustrating an example of the relationship between the amplitude spectrum and the correction gain after the noise suppression on the two successive frames. In the upper graph of FIG. 3, the horizontal axis indicates a frequency while the vertical axis indicates the strength of an amplitude component. Graph 301 indicates the amplitude spectrum of the current frame, whereas graph 302 indicates the amplitude spectrum of the preceding frame. In this example, as is evident from graph 301 and graph 302, the amplitude component of the current frame considerably decreases in strength at frequency f1 as compared with the amplitude component of the preceding frame after the noise suppression. At a frequency other than frequency f1, the difference is small between the amplitude components of the two frames after the noise suppression.

In the lower graph of FIG. 3, the horizontal axis indicates a frequency while the vertical axis indicates a correction gain. Graph 303 indicates the relationship between a frequency and a correction gain. As indicated by graph 303, the correction gain is larger than 1 at frequency f1 where the difference is relatively large between the amplitude components of the two successive frames after the noise suppression, whereas at a frequency other than frequency f1, the correction gain is 1. Thus, at frequency f1, where the difference between the amplitude components of the two frames is relatively large after the noise suppression, the amplitude component of the current frame is emphasized, thereby reducing the difference between the amplitude components of the two frames also at frequency f1 after the noise suppression.

The gain computation unit 16 outputs, for each of the frames, a correction gain for each frequency to the correction unit 17.

The correction unit 17 corrects, for each of the frames, an amplitude component for each frequency by multiplying a correction gain at the frequency corresponding to the amplitude component after the noise suppression. In other words, the correction unit 17 computes a corrected amplitude component for each frequency according to the following equation:

$$|X_t'(f)|=G(f) \times |X_t(f)| \quad (5)$$

where $|X_t'(f)|$ is a corrected amplitude component at the frequency f in the current frame. For each of the frames, the correction unit 17 stores a corrected amplitude component for each frequency in the buffer 18 and outputs the amplitude component to the frequency time transform unit 19.

The buffer 18 stores noise models for the current frame and the preceding frame and the amplitude spectrum after the noise suppression. The noise models stored in the buffer 18 are used for updating of the noise models and suppression of the noise components. Moreover, the amplitude spectrum stored in the buffer 18 after the noise suppression is used for computing the ratio r(f).

The frequency time transform unit 19 determines, for each of the frames, a corrected frequency spectrum by combining the corrected amplitude spectrum containing a corrected amplitude component for each frequency and a phase spectrum. Moreover, the frequency time transform unit 19 performs a frequency time transform on the corrected frequency spectrum into a time domain signal, thereby obtaining a corrected voice signal for each of the frames. The frequency time transform is the inversion of the time frequency transform performed by the time frequency transform unit 12.

The frequency time transform unit 19 outputs a corrected voice signal for each of the frames to the combination unit 20.

The combination unit 20 computes the corrected voice signal by adding the corrected voice signals of the successive time-ordered frames (in the order of reproduction) while shifting each of the frames by one-half of a frame length. The combination unit 20 then outputs the corrected voice signal.

Figure 4:
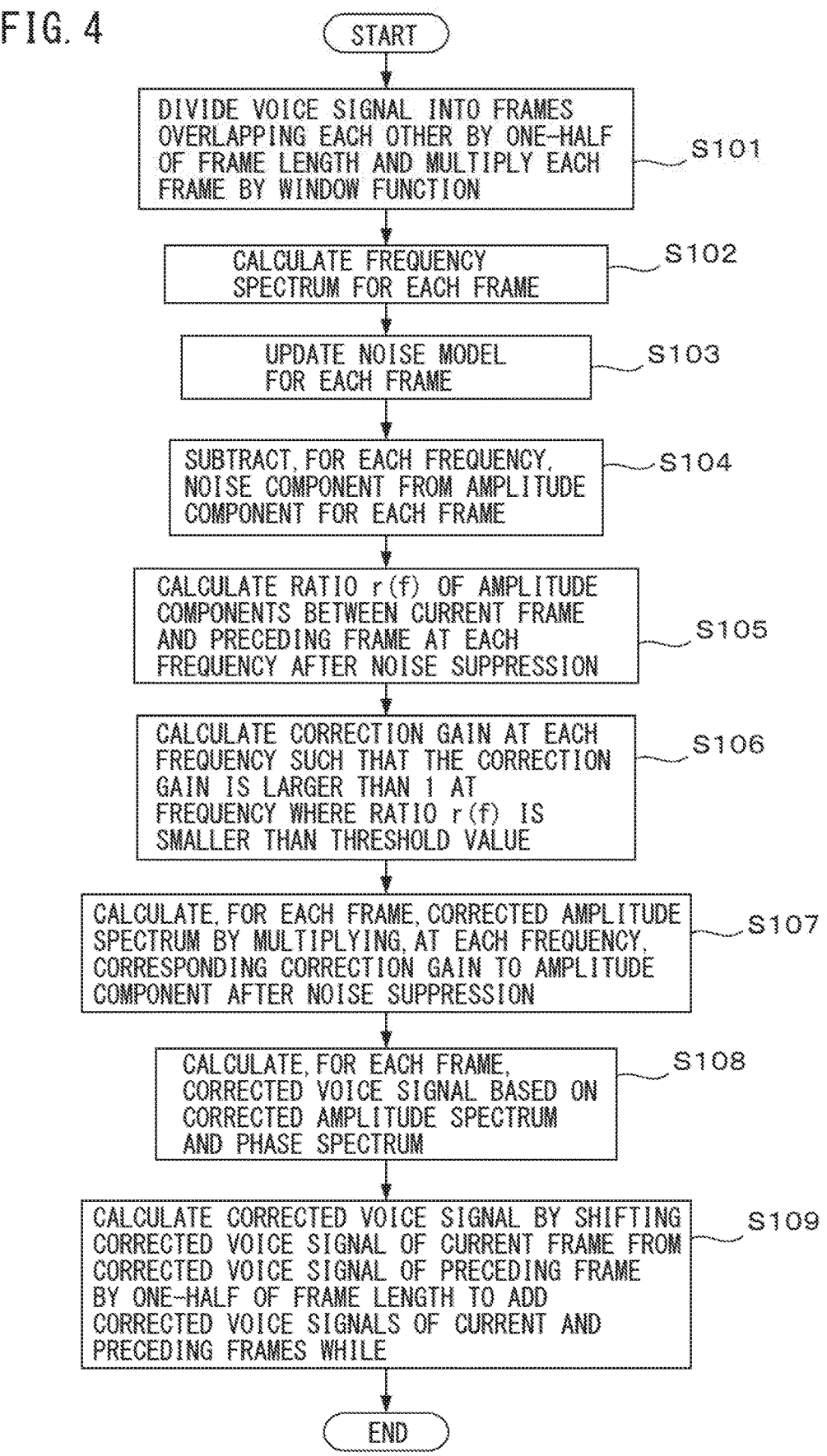
FIG. 4 is an operation flowchart of noise suppression according to the first embodiment.

FIG. 4 is an operation flowchart of noise suppression according to the first embodiment. The noise suppression device 4 suppresses noise according to the following operation flowchart.

The windowing unit 11 divides the voice signal into frames such that successive frames overlap each other by one-half of a frame length. The windowing unit 11 then multiplies each of the frames by a Hanning window function (step S101). The time frequency transform unit 12 transforms each of the frames from a time domain to a frequency domain, to compute a frequency spectrum (step S102).

The noise estimation unit 13 updates a noise model representing a noise component for each frequency for each of the frames (step S103). For each of the frames, the noise suppression unit 14 subtracts a noise component for each frequency from an amplitude component for each frequency, the noise component being represented by the noise model. Thus, noise contained in the voice signal is suppressed (step S104).

The comparison unit 15 computes, for each of the frames, the ratio r(f) of amplitude components between the current frame and the preceding frame for each frequency after the noise suppression (step S105). Subsequently, the gain computation unit 16 computes a correction gain for each of the frames based on the ratio r(f) (step S106). At this point, the gain computation unit 16 computes a correction gain for each frequency such that the correction gain is larger than 1 at a frequency where the ratio r(f) is smaller than the threshold value. The correction unit 17 computes, for each of the frames, the corrected amplitude spectrum by multiplying, for each frequency, the correction gain corresponding to the amplitude component after the noise suppression (step S107).

The frequency time transform unit 19 computes, for each of the frames, the corrected frequency spectrum by combining the corrected amplitude spectrum and the phase spectrum. Moreover, the frequency time transform unit 19 performs a frequency time transform on the corrected frequency spectrum into a time domain signal, to obtain a corrected voice signal for each of the frames (step S108). The combination unit 20 then computes the corrected voice signal by adding the corrected voice signals of the frames while shifting each of the corrected voice signals from the corrected voice signal of the preceding frame by one-half of the frame length (step S109). Subsequently, the noise suppression device 4 completes noise suppression.

As described above, the noise suppression device compares amplitude spectrums between the two successive frames after the noise suppression and computes a correction gain larger than 1 at a frequency where the difference between the frames is relatively large. Moreover, the noise suppression device corrects the amplitude spectrum after the noise suppression according to the correction gain. Thus, even when the voice signal contains a quite large noise component, the noise suppression device can suppress distortion of the corrected voice signal while suppressing the noise component.

According to a modified example, the comparison unit 15 may compute the ratio r(f) using the amplitude spectrum of each of the frame before the noise suppression unit 14 suppresses a noise component. In this case, the comparison unit 15 may compute the ratio r(f) as a comparison value for each frequency according to the following equation:

$$r(f) = \frac{|X_t^{pre}(f)|}{|X_{t-1}^{pre}(f)|} \tag{6}$$

where $X_t^{pre}(f)$ is an amplitude component of the current frame before noise is suppressed at the frequency (in other words, an amplitude component that is outputted from the time frequency transform unit 12 and is directly inputted to the comparison unit 15) and $X_{t-1}^{pre}(f)$ is an amplitude component of the preceding frame of the current frame before the noise suppression at the frequency f. The comparison unit 15 may include a delay circuit that delays $X_t^{pre}(f)$ by a time equivalent to one-half of a frame length in order to compute the ratio r(f) according to equation (6).

According to the modified example, the ratio r(f) is computed using the amplitude spectrum of each frame before being affected by noise suppression, allowing the noise suppression device to more accurately identify a frequency where distortion occurs, for example, between a sound source and a microphone. Thus, the gain computation unit 16 may set the value of the correction factor β in equation (4) to a value higher than that of the foregoing embodiment.

According to another modified example, the comparison unit 15 may compute the ratio of amplitude spectrums between successive frames according to equation (3) after a noise component is suppressed, and the comparison unit 15 may compute the ratio of amplitude spectrums between the successive frames according to equation (6) before a noise component is suppressed. In this case, for the convenience of explanation, r'(f) represents the computed ratio of amplitude spectrums between the successive frames according to equation (3) after a noise component is suppressed and r(f) represents the computed ratio of amplitude spectrums between the successive frames according to equation (6) before a noise component is suppressed.

Moreover, the gain computation unit 16 may compute a correction gain for each frequency by comparing the ratio r(f) and the ratio r'(f) for each frequency. For example, the gain computation unit 16 computes a correction gain for each frequency according to the following equation:

$$G(f) = \eta \frac{r(f)}{r'(f)} \quad \text{if } r'(f) < \gamma r(f) \tag{7}$$

-continued $$G(f) = 1.0 \quad \text{if } r'(f) \geq \gamma r(f)$$

where γ is a threshold value set at 0 to 1, e.g., 0.5, η is a correction factor set at a positive value larger than 0, e.g., 0.5, and G(f) is a correction gain at the frequency f. The correction factor η is preferably equal to or smaller than 1. Also in the modified example, the correction factor η is preferably 1 or less. This is because a correction factor η larger than 1 may excessively increase the value of the correction gain G(f) and the correction gain may distort the corrected voice signal.

As is evident from equation (7), in the modified example, the correction gain is set larger than 1 at a frequency where the ratio of amplitude components between the successive frames makes a relatively large change before and after the noise suppression. Thus, according to the modified example, the noise suppression device can precisely specify a frequency where noise suppression excessively changes an amplitude component, and correct the amplitude component so as to reduce a difference between the amplitude components of the frames after the noise compression at the frequency. Thus, the noise suppression device according to the modified example can suppress distortion of the corrected voice signal, the distortion being caused by excessive noise suppression.

A noise suppression device according to a second embodiment will be described below. The noise suppression device according to the second embodiment suppresses noise from a sound source other than a target sound source by using multiple microphones installed at different locations.

Figure 5:
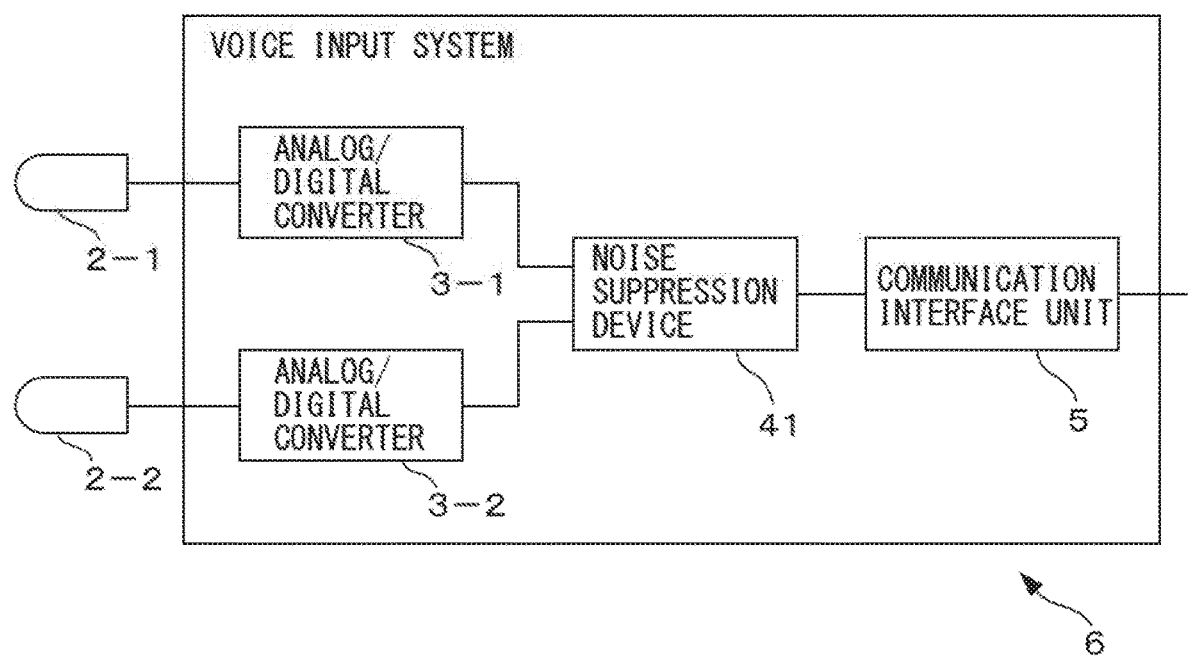
FIG. 5 is a schematic diagram illustrating the configuration of a voice input device including a noise suppression device according to a second embodiment.

FIG. 5 is a schematic diagram illustrating the configuration of a voice input device including the noise suppression device according to the second embodiment. A voice input device 6 includes two microphones 2-1 and 2-2, two analog/digital converters 3-1 and 3-2, a noise suppression device 41, and a communication interface unit 5. The voice input device 6 is installed in, for example, a vehicle (not illustrated). The voice input device 6 collects a voice from a driver and outputs the voice to, for example, a navigation system (not illustrated) or a hands-free phone (not illustrated).

The microphones 2-1 and 2-2 are examples of a voice input unit and are disposed at different positions. For example, the microphone 2-1 is disposed near a driver as a target sound source around, for example, an instrument panel or an interior ceiling near the driver, whereas the microphone 2-2 is disposed near a passenger as a noise source (hereinafter will be simply referred to as a noise source) on a passenger seat around, for example, an interior ceiling near the passenger. An analog voice signal generated by collecting sound through the microphone 2-1 is inputted to the analog/digital converter 3-1. Similarly, an analog voice signal generated by collecting sound through the microphone 2-2 is inputted to the analog/digital converter 3-2.

The analog/digital converter 3-1 amplifies the analog voice signal received from the microphone 2-1 and then samples the voice signal at a predetermined sampling frequency so as to digitize the voice signal. Similarly, the analog/digital converter 3-2 amplifies the analog voice signal received from the microphone 2-2 and then samples the voice signal at the predetermined sampling frequency so as to digitize the voice signal.

For the convenience of explanation, the voice signal that is generated by collecting sound through the microphone 2-1 and digitized by the analog/digital converter 3-1 will be referred to as a first voice signal. Furthermore, the voice signal that is generated by collecting sound through the microphone 2-2 and digitized by the analog/digital converter 3-2 will be referred to as a second voice signal.

The analog/digital converter 3-1 outputs the first voice signal to the noise suppression device 41. Similarly, the analog/digital converter 3-2 outputs the second voice signal to the noise suppression device 41.

Figure 6:
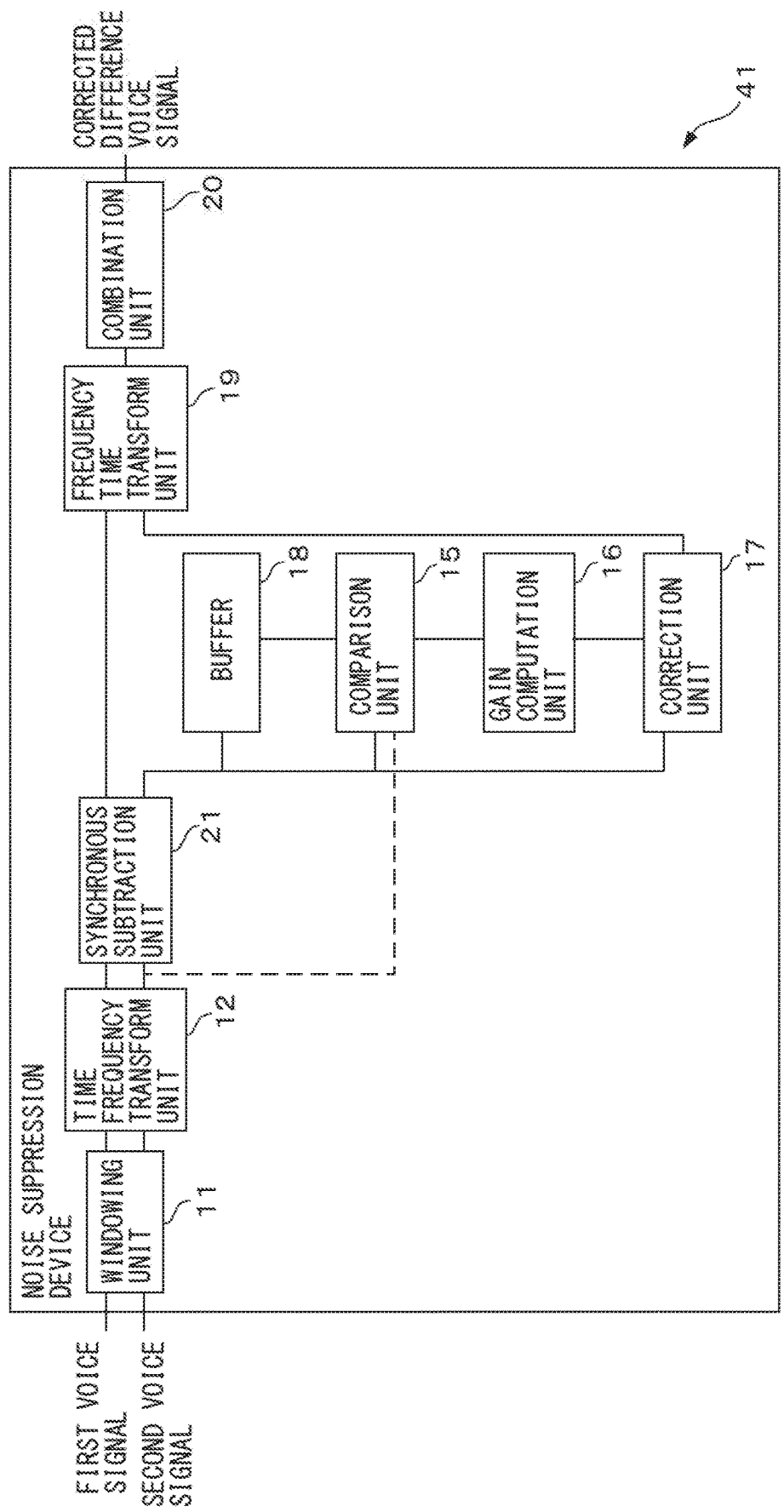
FIG. 6 is a schematic diagram illustrating the configuration of the noise suppression device according to the second embodiment.

FIG. 6 is a schematic diagram illustrating the configuration of the noise suppression device 41 according to the second embodiment. The noise suppression device 41 includes a windowing unit 11, a time frequency transform unit 12, a synchronous subtraction unit 21, a comparison unit 15, a gain computation unit 16, a correction unit 17, a buffer 18, a frequency time transform unit 19, and a combination unit 20. The units of the noise suppression device 41 are, for example, function modules implemented by computer programs executed on a digital signal processor. Alternatively, these units may be at least one integrated circuit for implementing the functions of the units. In FIG. 6, the component elements of the noise suppression device 41 are designated by the same reference numerals as those of the noise suppression device 4 illustrated in FIG. 2.

The noise suppression device 41 according to the second embodiment is different from the noise suppression device 4 according to the first embodiment in that the synchronous subtraction unit 21 is provided instead of the noise estimation unit 13 and the noise suppression unit 14. Moreover, different signals are processed by the windowing unit 11, the time frequency transform unit 12, the comparison unit 15, and the frequency time transform unit 19. In the following explanation, the windowing unit 11, the time frequency transform unit 12, the comparison unit 15, the frequency time transform unit 19, the synchronous subtraction unit 21, and the related parts thereof will be discussed. For other component elements of the noise suppression device 41, refer to the foregoing description of the equivalent component elements of the first embodiment.

As in the foregoing embodiment, the windowing unit 11 divides first and second voice signals into frames, each having a predetermined length of time (e.g., several tens of msec). The windowing unit 11 sets the frames of the first and second voice signals such that the two successive frames are shifted from each other by one-half of a frame length.

Moreover, the windowing unit 11 multiplies each of the frames of the first and second voice signals by a predetermined window function. For example, the windowing unit 11 can use a Hanning window as a window function.

The windowing unit 11 outputs the frames of the first and second voice signals to the time frequency transform unit 12 after the windowing.

Each time the time frequency transform unit 12 receives the frames of the first and second voice signals after the windowing, the time frequency transform unit 12 transforms the frames from a time domain to a frequency domain, to compute a frequency spectrum. Also in the present embodiment, the time frequency transform unit 12 can use an FFT as a time frequency transform as in the foregoing embodiment.

The time frequency transform unit 12 outputs the frequency spectrums of the respective frames of the first and second voice signals to the synchronous subtraction unit 21. For the convenience of explanation, a frequency spectrum obtained from the first voice signal will be referred to as a first frequency spectrum, whereas a frequency spectrum obtained from the second voice signal will be referred to as a second frequency spectrum. The first and second frequency spectrums are complex spectrums, each containing an amplitude spectrum and a phase spectrum.

The synchronous subtraction unit 21 is another example of a noise suppression unit. The synchronous subtraction unit 21 subtracts the second frequency spectrum, which is delayed by a predetermined delay amount, from the first frequency spectrum of each frame. Thus, the synchronous subtraction unit 21 computes a difference frequency spectrum that contains a voice of a driver as a target sound source and corresponds to a spectrum where a voice from a noise source is removed. For example, the synchronous subtraction unit 21 computes the difference frequency spectrum according to the following equation:

$$X_t(f) = X1_t(f) - e^{-j2\pi df/N} \times X2_t(f) \tag{8}$$

$$|X_t(f)| = \sqrt{(\text{Re}(X_t(f)))^2 + (\text{Im}(X_t(f)))^2}$$

$$P(X_t(f)) = \tan^{-1}\left(\frac{\text{Im}(X_t(f))}{\text{Re}(X_t(f))}\right)$$

where $X1_t(f)$ is the first frequency spectrum of the current frame, $X2_t(f)$ is the second frequency spectrum of the current frame, N is a frame length, and d is a delay amount(samples). The delay amount d is set at a value determined by a difference between a distance from a passenger's mouth as a noise source to the microphone 2-1 and a distance from the passenger's mouth to the microphone 2-2. $X_t(f)$ is a difference frequency spectrum for the current frame. $|X_t(f)|$ is the amplitude spectrum of the difference frequency spectrum for the current frame and contains an amplitude component at every frequency f. $P(X_t(f))$ is the phase spectrum of the difference frequency spectrum for the current frame and contains a phase component at every frequency f. Moreover, $\text{Re}(X_t(f))$ and $\text{Im}(X_t(f))$ are a real component and an imaginary component of the difference frequency spectrum for the current frame.

For each of the frames, the synchronous subtraction unit 21 outputs the amplitude spectrum of the difference frequency spectrum to the comparison unit 15 and the correction unit 17. Furthermore, the synchronous subtraction unit 21 stores the amplitude spectrum of the difference frequency spectrum in the buffer 18. Moreover, the synchronous subtraction unit 21 outputs, for each of the frames, the phase spectrum of the difference frequency spectrum to the frequency time transform unit 19. The amplitude spectrum of the difference frequency spectrum is another example of a noise suppression amplitude component.

The comparison unit 15 compares the amplitude spectrums of difference frequency spectrums between the two successive frames. For example, the comparison unit 15 computes, as a comparison value, a ratio r(f) of the amplitude components of the two frames at every frequency f according to the following equation:

$$r(f) = \frac{|X_t(f)|}{|X_{t-1}(f)|} \tag{9}$$

where $|X_t(f)|$ is the amplitude spectrum of the difference frequency spectrum in the current frame and $|X_{t-1}(f)|$ is the amplitude spectrum of the difference frequency spectrum in the preceding frame. The comparison unit 15 may compute a ratio r(f) according to $|X_{t-1}(f)|$ read from the buffer 18.

For each of the frames, the comparison unit 15 outputs the ratio r(f) for each frequency to the gain computation unit 16, the ratio r(f) having been computed between the current frame and the preceding frame.

The gain computation unit 16 computes, for each of the frames, a correction gain for each frequency based on the ratio r(f). Also in the present embodiment, the gain computation unit 16 may compute a correction gain for each frequency according to, for example, equation (4). For each of the frames, the gain computation unit 16 outputs a correction gain for each frequency to the correction unit 17.

The correction unit 17 corrects, for each of the frames, an amplitude component for each frequency by multiplying an amplitude component for each frequency by the corresponding correction gain, the amplitude component being contained in the amplitude spectrum of the difference frequency spectrum. Thus, the correction unit 17 obtains the corrected amplitude spectrum. Moreover, the correction unit 17 outputs, for each of the frames, the corrected amplitude spectrum to the frequency time transform unit 19.

The frequency time transform unit 19 calculates, for each of the frames, a corrected difference frequency spectrum by combining the corrected amplitude spectrum of the difference frequency spectrum and the phase spectrum of the difference frequency spectrum. Moreover, the frequency time transform unit 19 performs a frequency time transform on the corrected difference frequency spectrum into a time domain signal, to obtain a corrected difference voice signal for each of the frames. The frequency time transform is the inversion of the time frequency transform performed by the time frequency transform unit 12. The frequency time transform unit 19 outputs a corrected difference voice signal for each of the frames to the combination unit 20.

The combination unit 20 computes the corrected difference voice signal by adding the corrected difference voice signals of the successive time-ordered frames (in the order of reproduction) while shifting each of the frames by one-half of a frame length. The combination unit 20 then outputs the corrected difference voice signal.

Figure 7:
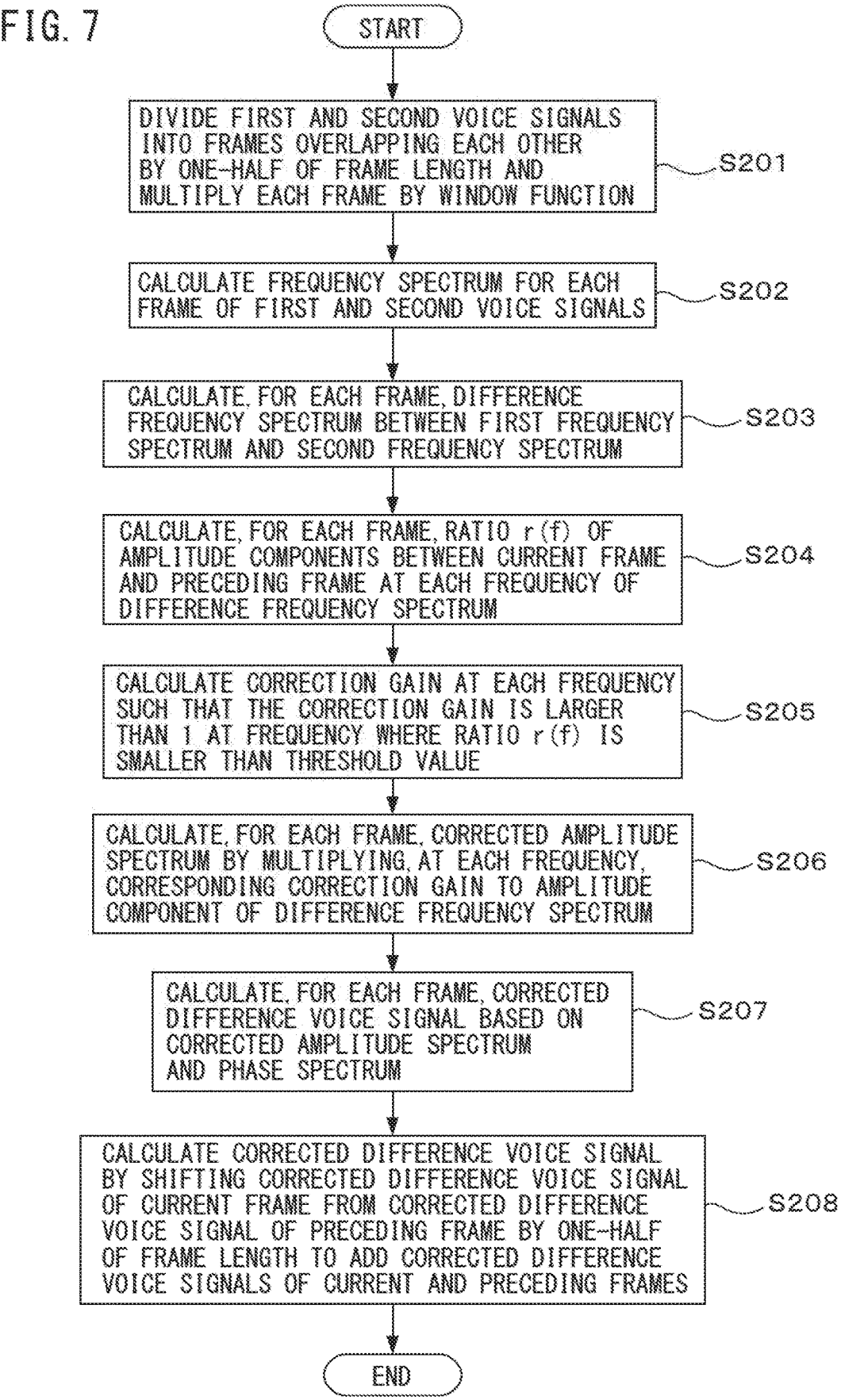
FIG. 7 is an operation flowchart of noise suppression according to the second embodiment.

FIG. 7 is an operation flowchart of noise suppression according to the second embodiment. The noise suppression device 41 suppresses noise according to the following operation flowchart.

The windowing unit 11 divides the first and second voice signals into frames such that successive frames overlap each other by one-half of a frame length. The windowing unit 11 then multiplies each of the frames by a Hanning window function (step S201). For the first and second voice signals, the time frequency transform unit 12 transforms each of the frames from a time domain to a frequency domain, to compute first and second frequency spectrums (step S202).

For each of the frames, the synchronous subtraction unit 21 computes a difference frequency spectrum by subtracting a second frequency, which is delayed by a predetermined delay amount, from the first frequency spectrum (step S203).

The comparison unit 15 computes, for each of the frames, the ratio r(f) of amplitude components between the current frame and the preceding frame for each frequency of the difference frequency spectrum (step S204). Subsequently, the gain computation unit 16 computes a correction gain for each of the frames for each frequency based on the ratio r(f) (step S205). The gain computation unit 16 computes a correction gain for each frequency such that the correction gain exceeds 1 at a frequency where the ratio r(f) is smaller than a threshold value. The correction unit 17 computes, for each of the frames, the corrected amplitude spectrum by multiplying, for each frequency, a correction gain corresponding to the amplitude component of the difference frequency spectrum (step S206).

The frequency time transform unit 19 computes, for each of the frames, the corrected difference frequency spectrum by combining the corrected amplitude spectrum and the phase spectrum. Moreover, the frequency time transform unit 19 performs a frequency time transform on the corrected difference frequency spectrum into a time domain signal, to obtain a corrected difference voice signal for each of the frames (step S207). The combination unit 20 then computes the corrected difference voice signal by adding the corrected difference voice signals of the frames while shifting each of the corrected difference voice signals from the corrected voice signal of the preceding frame by one-half of a frame length (step S208). Subsequently, the noise suppression device 41 completes the noise suppression process.

As described above, the noise suppression device according to the second embodiment also compares the amplitude spectrums of difference frequency spectrums between the two successive frames and computes a correction gain so as to reduce a difference between the frames at a frequency where the difference is relatively large. Moreover, the noise suppression device corrects the amplitude spectrum of the difference frequency spectrum according to the correction gain. Thus, even when a quite large voice is outputted as noise from a passenger, the noise suppression device can suppress distortion of the corrected voice signal while suppressing a noise component corresponding to the voice of the passenger.

According to a modified example of the second embodiment, the comparison unit 15 may compute the ratio r(f) using the amplitude spectrum of the first frequency spectrum in each of the frames. In this case, the comparison unit 15 may compute the ratio r(f) as a comparison value for each frequency according to the following equation:

$$r(f) = \frac{|X1_t^{pre}(f)|}{|X1_{t-1}^{pre}(f)|} \quad (10)$$

where $|X1_t^{pre}(f)|$ is the amplitude spectrum of the first frequency spectrum in the current frame (in other words, an amplitude spectrum that is outputted from the time frequency transform unit 12 and is directly inputted to the comparison unit 15) and $|X1_{t-1}^{pre}(f)|$ is the amplitude spectrum of the first frequency spectrum in the preceding frame of the current frame. The comparison unit 15 may include a delay circuit that delays $|X1_t^{pre}(f)|$ by a time equivalent to one-half of a frame length in order to compute the ratio r(f) according to equation (10).

According to the modified example, the ratio r(f) is computed based on the amplitude spectrum of the first frequency spectrum before being affected by a difference, allowing the noise suppression device to more accurately identify a frequency where distortion occurs, for example, between a sound source and a microphone. Thus, the gain computation unit 16 may set the value of the correction factor β in equation (4) to a value higher than that of the second embodiment.

According to another modified example, the comparison unit 15 may compute the ratio of the amplitude spectrums of the difference frequency spectrums between the successive frames according to equation (9) and compute the ratio of the amplitude spectrums of the first frequency spectrums between successive frames according to equation (10). For the convenience of explanation, r'(f) represents the computed ratio of the amplitude spectrums of the difference frequency spectrums between the successive frames according to equation (9) and r(f) represents the computed ratio of the amplitude spectrums of the first frequency spectrums between the successive frames according to equation (10).

The gain computation unit 16 may compute a correction gain for each frequency by comparing the ratio r(f) and the ratio r'(f) for each frequency. For example, the gain computation unit 16 may compute a correction gain for each frequency according to equation (7).

In the modified example, a frequency is detected where the ratio of amplitude components between the successive frames makes a relatively large change before and after the synchronous subtraction, and the correction gain is then set at a value larger than 1 at the frequency. Thus, according to the modified example, the noise suppression device can precisely specify a frequency where synchronous subtraction excessively changes an amplitude component, and correct the amplitude component so as to reduce a difference between the amplitude components of the frames after the noise compression at the frequency. Thus, the noise suppression device according to the modified example can suppress distortion of the corrected difference voice signal, the distortion being caused by excessive noise suppression during the synchronous subtraction.

Further, in the first embodiment, the comparison unit 15 may compute, as a comparison value, a difference obtained by subtracting an amplitude spectrum after noise suppression in the preceding frame from an amplitude spectrum after noise suppression in the current frame. The gain computation unit 16 may compute a correction gain larger than 1 at a frequency where the difference exceeds the threshold value. Similarly, also in the other embodiment, the comparison unit 15 may compute, as a comparison value, a difference obtained by subtracting a difference frequency spectrum in the preceding frame from a difference frequency spectrum in the current frame. Alternatively, the comparison unit 15 may compute, as a comparison value, a difference obtained by subtracting an amplitude spectrum before noise suppression in the preceding frame from an amplitude spectrum before noise suppression in the current frame. The gain computation unit 16 may compute a correction gain larger than 1 at a frequency where the difference is larger than the predetermined threshold value.

In the embodiments or the modified examples, the comparison unit 15 may compare an amplitude spectrum in the current frame with an amplitude spectrum in the subsequent frame as well as an amplitude spectrum in the preceding frame. In this case, the comparison unit 15 temporarily stores the amplitude spectrum of the current frame in the buffer 18 until the amplitude spectrum of the subsequent frame is obtained. The comparison unit 15 may compute the ratio r(f) by using the amplitude spectrum of the subsequent frame instead of the amplitude spectrum of the preceding frame according to equation (3), (6), (9) or (10). For the convenience of explanation, the ratio of the amplitude spectrum of the preceding frame and the amplitude spectrum of the current frame is designated as r1(f) while the ratio of the amplitude spectrum of the subsequent frame and the amplitude spectrum of the current frame is designated as r2(f).

In this case, for example, the gain computation unit 16 may compute a correction gain such that the correction gain exceeds 1 at a frequency where r1(f) or r2(f) is smaller than the predetermined threshold value. Moreover, the gain computation unit 16 may compute a correction gain such that the correction gain is smaller than 1 at a frequency where r1(f)

and r2(f) are both larger than the threshold value (e.g., 2 to 3). Thus, the noise suppression device can more accurately detect a frequency where distortion occurs, thereby more properly suppressing distortion after the correction.

According to another modified example, the windowing unit 11 may set the overlapping length of the two successive frames at, for example, three-fourths of a frame length or seven-eighths of a frame length instead of one-half of a frame length. In this case, the windowing unit 11 may multiply each of the frames by a window function corresponding to the overlapping length of two successive frame such that distortion does not occur when the corrected voice signals of the frames are added while being shifted by the overlapping length.

A voice may be recognized based on the corrected voice signal or corrected difference voice signal for each of the frames. From the corrected voice signal or corrected difference voice signal for each of the frames, features for voice recognition, e.g., a pitch period, power, and cepstrum coefficients may be calculated. In this case, for example, a voice is recognized by inputting these features to a classifier for voice recognition based on a hidden Markov model. Hence, the combination unit 20 may be omitted in the noise suppression devices according to the embodiments or modified examples.

The noise suppression devices according to the embodiments or the modified examples may be used for various voice collecting devices, e.g., a mobile phone and a videoconference system or various devices for processing in response to recognition results. Furthermore, computer programs may be recorded on computer-readable media such as a magnetic recording medium or an optical recording medium, the computer programs allowing a computer to execute the functions of the units of the noise suppression devices according to the embodiments or the modified examples. The recording media do not include a carrier wave.

FIG. 8 is a block diagram of a computer operated as a noise suppressing device by executing computer programs for implementing the functions of the units of the noise suppression device according to any one of the embodiments or the modified examples.

A computer 100 includes a user interface unit 101, an audio interface unit 102, a communication interface unit 103, a storage unit 104, a storage media access device 105, and a processor 106. The processor 106 is connected to the user interface unit 101, the audio interface unit 102, the communication interface unit 103, the storage unit 104, and the storage media access device 105 via, for example, a bus.

The user interface unit 101 includes, for example, input devices such as a keyboard and a mouse and display devices such as a liquid crystal display. Alternatively, the user interface unit 101 may include a combined unit of an input device and a display device, e.g., a touch panel display. For example, the user interface unit 101 outputs an operation signal to the processor 106. The operation signal starts noise suppression on a voice inputted through the audio interface unit 102 in response to a user operation.

The audio interface unit 102 includes an interface circuit for connecting, to the computer 100, a voice input device such as a microphone that generates the voice signal. Furthermore, the audio interface unit 102 acquires the voice signal from the voice input device and passes the voice signal to the processor 106.

The communication interface unit 103 includes a communication interface for connecting the computer 100 to a communication network conforming to communication standards such as Ethernet (registered trademark), and a control circuit of the communication interface. The communication interface unit 103 acquires a packet including the voice signal from another device connected to the communication network, and passes the voice signal to the processor 106. Moreover, the communication interface unit 103 may output a packet including the voice signal received with suppressed noise from the processor 106, to another device through the communication network.

The storage unit 104 includes, for example, a read/write semiconductor memory and a read-only semiconductor memory. Moreover, the storage unit 104 stores a computer program to be executed for suppressing noise on the processor 106, and various kinds of data generated during or as a result of the noise suppression.

The storage media access device 105 is a device that accesses a storage medium 107, e.g., a magnetic disk, a semiconductor memory card, or an optical storage medium. The storage media access device 105 reads, for example, the computer program stored in the storage medium 107 to suppress noise and passes the program to the processor 106 to execute the program on the processor 106.

The processor 106 executes the computer program for noise suppression according to one of the embodiments or the modified examples, to correct the voice signal received through the audio interface unit 102 or the communication interface unit 103. The processor 106 then stores the corrected voice signal in the storage unit 104 or outputs the voice signal to another device through the communication interface unit 103.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A noise suppression device comprising:
a processor configured to:
divide a first voice signal into frames, each having a predetermined length of time, such that the two successive frames overlap each other, the first voice signal being obtained by a first microphone;
transform the first voice signal into a frequency domain for each of the frames to compute a first frequency spectrum for the first voice signal;
remove, for each of the frames, a noise component from an amplitude component of the first frequency spectrum for each frequency to compute a noise suppression amplitude component;
compare, for each pair of the successive frames, the noise suppression amplitude components for each frequency of the first frequency spectrum to compute a comparison value for each frequency, the comparison value for each frequency being a ratio of the noise suppression amplitude component of the latter frame of the pair to the noise suppression amplitude component of the former frame of the pair;

compute, for each pair of the successive frames, a gain for correcting the noise suppression amplitude component according to the comparison value for each frequency;

compute, for each pair of the successive frames, a corrected amplitude component for each frequency by multiplying the noise suppression amplitude component of one of the frames for each frequency by the corresponding gain;

compute, for each of the frames, a corrected frequency spectrum from a phase component of the first frequency spectrum and the corrected amplitude component for each frequency; and transform the corrected spectrum into a time domain to compute a corrected voice signal.

2. The noise suppression device according to claim 1, wherein computation of the gain includes computing, for each pair of the successive frames, the gain so as to reduce a difference between the noise suppression component of the former frame of the pair and the noise suppression amplitude component of the latter frame of the pair at a frequency where the comparison value is smaller than a predetermined threshold value.

3. The noise suppression device according to claim 1, wherein the processor is further configured to estimate, for each of the frames, a noise component contained in the voice signal for each frequency, wherein computation of the noise suppression amplitude component includes computing the noise suppression amplitude component by subtracting the noise component from the amplitude component for each frequency.

4. The noise suppression device according to claim 1, wherein the processor is further configured to divide a second voice signal into frames, the second voice signal being obtained by a second microphone provided at a different position from the first microphone; and transform the second voice signal into a frequency domain for each of the frames to compute a second frequency spectrum of the second voice signal, wherein computation of the noise suppression amplitude component includes computing the noise suppression amplitude component for each frequency by subtracting, for each of the frames, the second frequency spectrum delayed by a predetermined delay amount from the first frequency spectrum.

5. The noise suppression device according to claim 3, wherein computation of the comparison value includes, for each pair of the successive frames, computing the ratio of the noise suppression amplitude components for each frequency as the comparison value, and computing a second comparison value of the amplitude components for each frequency of the frequency spectrum, and computation of the gain includes setting, for each pair of the successive frames, the gain at a value larger than 1 at a frequency where a ratio of the comparison value to the second comparison value is smaller than a predetermined threshold value.

6. A noise suppressing method comprising:

dividing a first voice signal into frames, each having a predetermined length of time, such that the two successive frames overlap each other, the first voice signal being obtained by a first microphone;

transforming the first voice signal into a frequency domain for each of the frames to compute a first frequency spectrum for the first voice signal;

removing, for each of the frames, a noise component from an amplitude component of the first frequency spectrum for each frequency to compute a noise suppression amplitude component;

comparing, for each pair of the successive frames, the noise suppression amplitude components for each frequency of the first frequency spectrum to compute a comparison value for each frequency, the comparison value for each frequency being a ratio of the noise suppression amplitude component of the latter frame of the pair to the noise suppression amplitude component of the former frame of the pair;

computing, for each pair of the successive frames, a gain for correcting the noise suppression amplitude component according to the comparison value for each frequency;

computing, for each pair of the successive frames, a corrected amplitude component for each frequency by multiplying the noise suppression amplitude component of one of the frames for each frequency by the corresponding gain;

computing, for each of the frames, a corrected frequency spectrum from a phase component of the first frequency spectrum and the corrected amplitude component for each frequency; and transforming the corrected spectrum into a time domain to compute a corrected voice signal.

7. The noise suppression method according to claim 6, wherein computation of the gain includes computing, for each pair of the successive frames, the gain so as to reduce a difference between the noise suppression component of the former frame of the pair and the noise suppression amplitude component of the latter frame of the pair at a frequency where the comparison value is smaller than a predetermined threshold value.

8. The noise suppression method according to claim 6, further comprising estimating, for each of the frames, a noise component contained in the voice signal for each frequency, wherein computation of the noise suppression amplitude component includes computing the noise suppression amplitude component by subtracting the noise component from the amplitude component for each frequency.

9. The noise suppression method according to claim 6, further comprising: dividing a second voice signal into frames, the second voice signal being obtained by a second microphone provided at a different position from the first microphone; and transforming the second voice signal into a frequency domain for each of the frames to compute a second frequency spectrum of the second voice signal, wherein computation of the noise suppression amplitude component includes computing the noise suppression amplitude component for each frequency by subtracting, for each of the frames, the second frequency spectrum delayed by a predetermined delay amount from the first frequency spectrum.

10. The noise suppression method according to claim 8, wherein computation of the comparison value includes, for each pair of the successive frames, computing the ratio of the noise suppression amplitude components for each frequency as the comparison value, and computing a second comparison value of the amplitude components for each frequency of the frequency spectrum, and computation of the gain includes setting, for each pair of the successive frames, the gain at a value larger than 1 at a frequency where a ratio of the comparison value to the second comparison value is smaller than a predetermined threshold value.

11. A non-transitory computer-readable recording medium having recorded thereon a noise suppression computer program that causes a computer to execute a process comprising:

dividing a first voice signal into frames, each frame having a predetermined length of time, such that the two successive frames overlap each other, the first voice signal being obtained by a first microphone;

transforming the first voice signal into a frequency domain for each of the frames to compute a first frequency spectrum for the first voice signal;

removing, for each of the frames, a noise component from an amplitude component of the first frequency spectrum for each frequency to compute a noise suppression amplitude component;

comparing for each pair of the successive frames the noise suppression amplitude components for each frequency of the first frequency spectrum to computer a comparison value for each frequency, the comparison value for each frequency being a ratio of the noise suppression amplitude component of the latter frame of the pair to the noise suppression amplitude component of the former frame of the pair;

computing, for each pair of the successive frames, a gain for correcting the noise suppression amplitude component according to the comparison value for each frequency;

computing, for each pair of the successive frames, a corrected amplitude component for each frequency by multiplying the noise suppression amplitude component of one of the frames for each frequency by the corresponding gain; and computing, for each of the frames, a corrected frequency spectrum from a phase component of the first frequency spectrum and the corrected amplitude component for each frequency; and transforming the corrected spectrum into a time domain to compute a corrected voice signal.

* * * * *